May 18, 1965

W. STELZER 3,183,789

FLUID PRESSURE MOTOR MECHANISM

Filed May 14, 1963

INVENTOR
WILLIAM STELZER

BY John F. Phillips
ATTORNEY

May 18, 1965

W. STELZER 3,183,789

FLUID PRESSURE MOTOR MECHANISM

Filed May 14, 1963

INVENTOR
WILLIAM STELZER

BY *John V. Phillips*

ATTORNEY

May 18, 1965 W. STELZER 3,183,789
FLUID PRESSURE MOTOR MECHANISM
Filed May 14, 1963 3 Sheets-Sheet 3
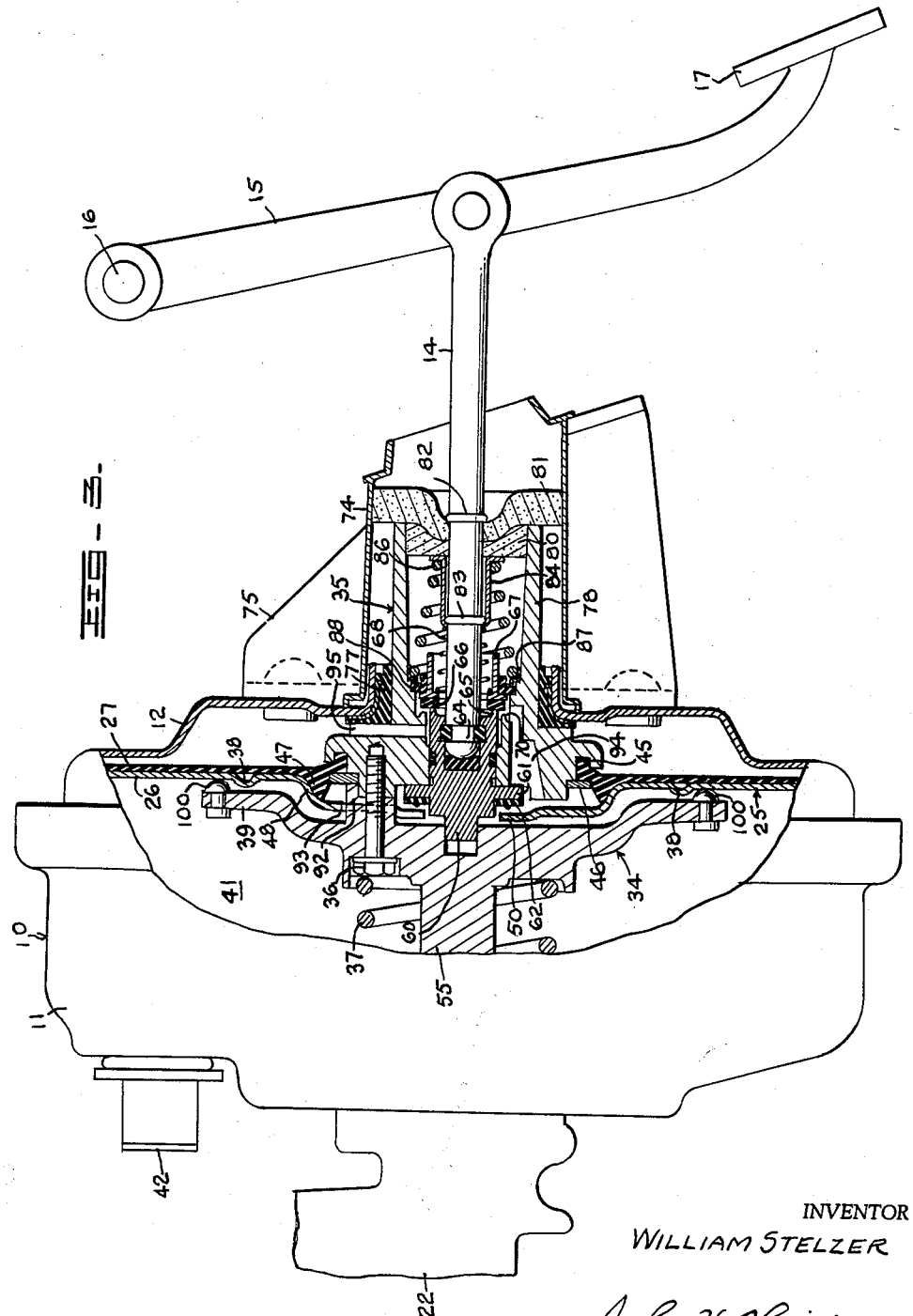
FIG - 3 -
INVENTOR
WILLIAM STELZER
BY John F. Phillips
ATTORNEY United States Patent Office 3,183,789
Patented May 18, 1965

3,183,789
FLUID PRESSURE MOTOR MECHANISM
William Stelzer, Bloomfield Hills, Mich., assignor to Kelsey-Hayes Company, Romulus, Mich., a corporation of Delaware
Filed May 14, 1963, Ser. No. 280,270
16 Claims. (Cl. 91—369)

This invention relates to a fluid pressure motor mechanism, and more particularly to such a mechanism especially adapted for the operation of motor vehicle hydraulic brakes.

A number of fluid pressure motor mechanisms for operating vehicle brakes have been devised in which some means is provided for reacting against the brake pedal to a degree proportional to the degree of energization of the motors. Such devices sometimes are relatively complicated and, in some of them, a smooth brake pedal reaction is not provided.

An important object of the present invention is to eliminate the use of substantial additional parts for providing the reaction force by using essential structural parts of the booster motor for this purpose.

A further object is to provide such a simplified construction wherein the application of reaction force in the initial stage of operation is delayed until the brake shoes are expanded to engage the drums.

A further object is to provide, as a part of the pressure responsive unit of the motor, a flexible plate which functions in the nature of a large Belleville washer the characteristics of which are utilized for providing the desired reaction force.

A further object is to utilize the rubber diaphragm associated with the diaphragm plate in a novel manner to obtain the desired retardation of the reaction forces and to provide a smooth transition to the normal reaction when the motor forces are increased.

Other objects and advantages of the invention will become apparent during the course of the following description.

In the drawings I have shown several embodiments of the invention. In this showing FIGURE 1 is an axial sectional view through the motor mechanism and associated parts;

FIGURE 2A is a fragmentary face view of a modified form of diaphragm plate, and

FIGURE 3 is a sectional view similar to FIGURE 1 and showing a modified form of the invention, parts being shown in elevation.

Figure 1:
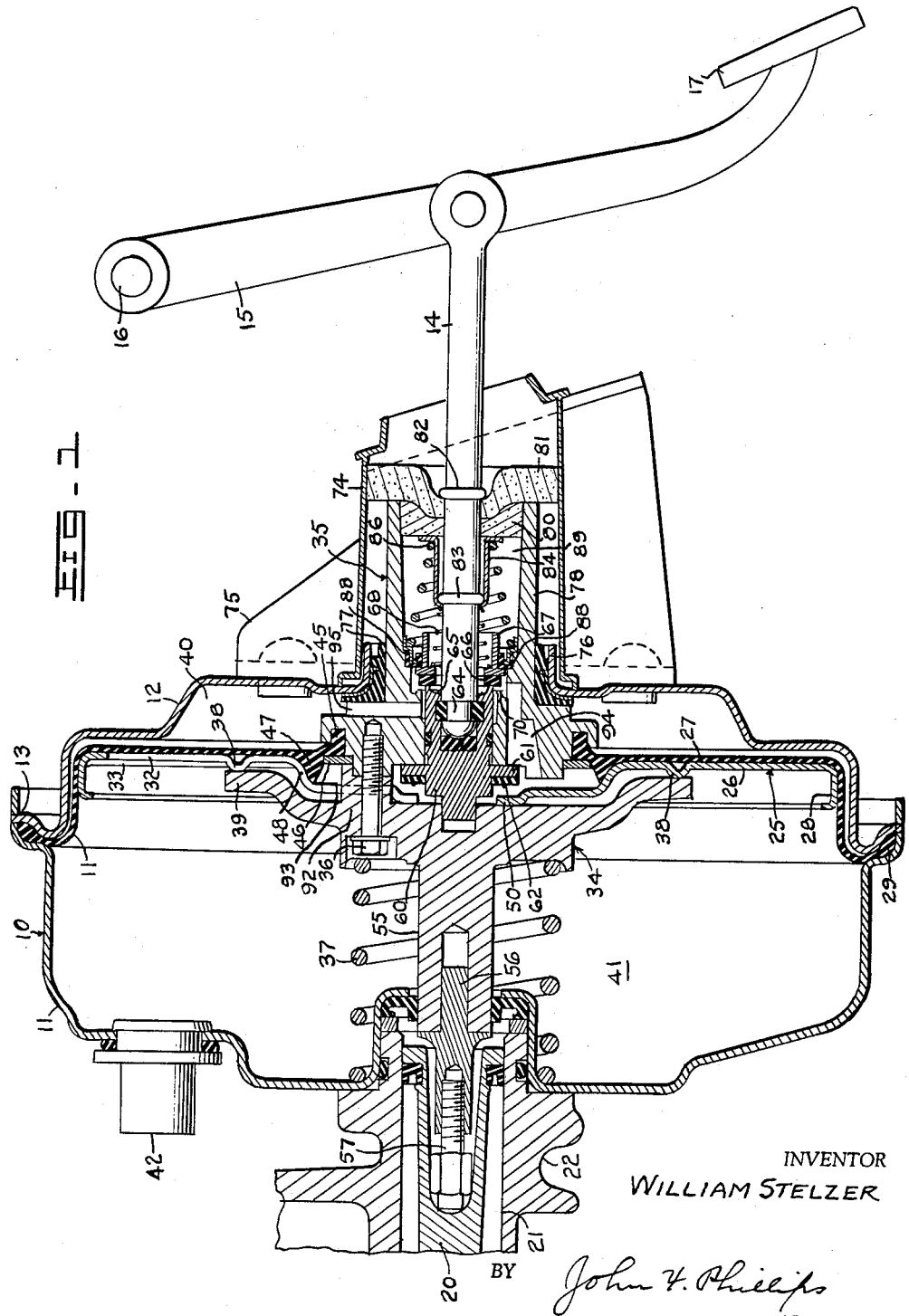

Referring to FIGURE 1, the numeral 10 designates the fluid pressure motor as a whole comprising casing sections 11 and 12 connected at their peripheries as at 13. A valve mechanism to be described controls energization of the motor and is operated by a push rod 14 connected to the usual preferably depending brake pedal 15 pivotally supported at its upper end as at 16 and provided at its lower end with a pedal pad 17. Energization of the motor operates a master cylinder plunger 20 operable in the bore 21 of a conventional master cylinder 22 to displace fluid through conventional brake lines to the front and rear wheel cylinders (not shown).

The motor is provided with a pressure responsive unit indicated as a whole by the numeral 25, and this unit comprises a diaphragm plate 26 and a diaphragm 27 the outer portion of which is adapted to roll on a flange 28 of the plate 26 and has a radially outer bead 29 clamped between the casing sections 11 and 12.

Figure 2:
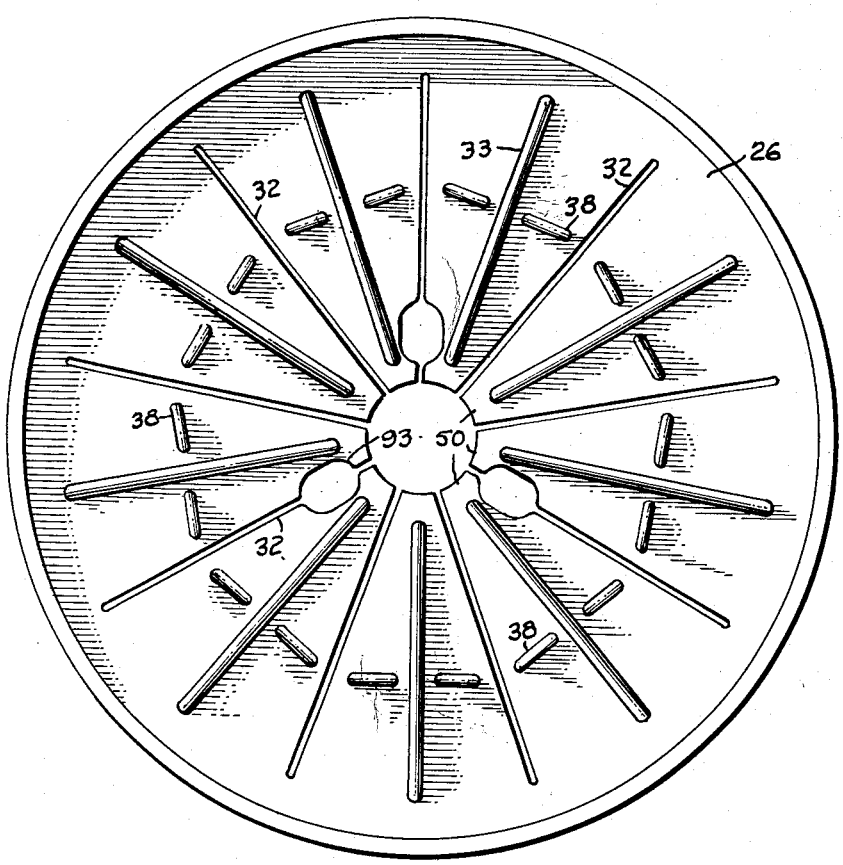
FIGURE 2 is a face view of the diaphragm plate.
Figure 2:
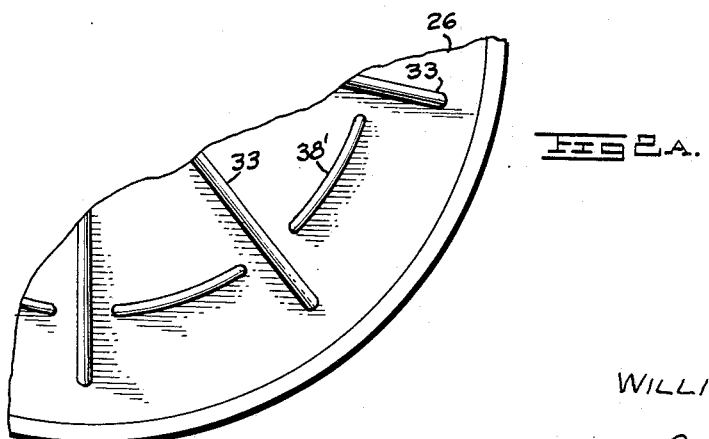

Referring to FIGURE 2, the plate 26 usually will be provided with radial slots 32 to weaken the plate as a spring for a purpose which will become apparent. If, in particular installations, greater resistance to distortion of the plate 26 is desired, the slots 32 may be shortened or eliminated entirely. Stiffness in the plate 26 also may be increased by providing the latter with radial stiffening ribs 33.

The pressure responsive unit 25 further comprises two rigid units 34 and 35 secured together by screws 36, and the pressure responsive unit is biased to its normal off position shown in FIGURE 1 by a return spring 37. The unit 34 includes a radially outwardly extending flange 39 usually normally engageable with annular ribs 38 formed on the plate 26 and acting as fulcrums on which the radially outer portion of the plate 26 rocks to the left when the motor is energized while the radially inner portion of the plate 26 rocks to the right. The portions of the plate 26 between the slots 32 are subject to flexing, as described below, in which case, the inner extremities of the segments move substantially longitudinally of the axis. In such case, the two ribs 38 of each segment are preferably aligned perpendicular to a radius which bisects the angle of such segment. Where no slots 32 are used, as in FIGURE 2A, no segments are formed and the fulcrum ribs 38' may be arcuate as to FIGURE 2A since in such case the flexing of the plate takes place by its bulging under axial forces. The rocking of the portions of the plate 26 as referred to takes place upon the admission of higher pressure to the variable pressure chamber 40 of the motor. In the present case, the motor is vacuum suspended and atmospheric pressure is admitted to the chamber 40. The constant pressure chamber 41 of the motor is connected through a fitting 42, including a check valve (not shown), to a source of available vacuum.

At its radially inner periphery, the diaphragm 27 is provided with a bead 45 clamped in position between the units 34 and 35, with a washer 46 arranged to the left of the bead 45 as viewed in FIGURE 1.

Radially outwardly of the bead 45 and to the side of the diaphragm 27 opposite such bead, the diaphragm is provided with another bead 47, and the adjacent portion of the plate 26 is shaped as at 48 to fit such bead. The inner periphery of the plate 26 is provided with a flange portion 50, divided in separate segments by the slots 32 and seating against the right-hand face of the flange 39.

The unit 34 is provided with an axially projecting portion 55 in which is fitted one end of a stem 56, the other end of which carries an adjustable force transmitting member 57 engageable with the master cylinder plunger 20.

A control piston 60 is slidable in the rigid member 35 and is provided with a head 61 having a rubber cushion 62 normally spaced from but engageable under conditions to be described by the flange 50. The cushion 62 may be in the form of a flat rubber washer or may be provided with small projections as shown, for additional cushioning. The control piston 60 is connected as at 64 with the push rod 14 to be moved to the left thereby when the pedal 15 is operated.

The control piston 60 is provided with a valve 65 normally engaged by a resilient valve seat 66 carried by a body 67 biased to the left by the spring 68. The valve 65 normally engages the seat 66 and maintains such seat disengaged from a valve 70 carried by the rigid unit 35.

A cylindrical cage 74 is connected by a bracket 75 to the casing section 12, and the adjacent end of such casing section is turned outwardly in a flange 76. Within the flange 76 and against the inner face of the adjacent end wall of the casing section 12 is arranged a sealing member and bumper 77. A sleeve portion 78 of the rigid unit 35 is slidable in the seal 77 and the inner portion of this seal acts as a bumper to limit movement of the pressure responsive unit to its off position shown.

Two air filters 80 and 81 surround the push rod 14, the filter 80 being slidable in the sleeve portion 78 and the filter 81 being slidable in the cage 74. The latter air filter is retained in position against an annular flange 82 on the push rod 14. This rod carries a second annnular flange 83 against which engages the inner end of a spring seat 84, and the spring 68 engages at one end against the seat 84 and at its opposite end against the member 67 to bias this member and the valve seat 66 to move to the left. The right-hand or rear end of the spring seat 84 is engaged by one end of a spring 86, the other end of which engages a seat 87 to bias the seat 84 and consequently the rod 14 to its normal off position. The seat 87 engages a seal 88 arranged between the sleeve portion 75 and member 67. Since the valve piston 60 is open to vacuum at its left hand and to atmospheric pressure at its right hand, the unbalance in pressure is compensated for by making the spring 86 sufficiently heavy to return the control piston 60 and rod 14 to their normal positions. The springs 68 and 86 are arranged in an atmospheric chamber 89 to which air is supplied through the air cleaners, which air is cut off from the motor by the valve 65 when the parts are in normal positions.

As previously stated, the motor chamber 41 is connected to a vacuum source. The screws 36 pass through bosses 92 formed on the flange 39 and extend through openings 93 in the plate 26, thus connecting to the vacuum chamber 41 a chamber 94 formed in the rigid body 35. The seal 88 acts to seal the chambers 89 and 94 from each other. The space within the valve 70 is connected by a passage 95 to the motor chamber 40, and with the valve 70 open, vacuum will be communicated to the chamber 40.

A slight modification of the invention is shown in FIGURE 3. Most of the parts are identical with the parts described in connection with FIGURES 1 and 2, and accordingly, the same reference characters have been applied to corresponding parts. In FIGURE 1, the ribs 38 provide fulcrum means for the plate 26 and, as will become more apparent below, reaction to the pedal is withheld during initial operation of the motor. In FIGURE 3, the ribs 38 are normally spaced from the flange 39 and a different initial fulcrum for the plate 26 is provided in the form of rubber buttons 100 which must yield before the ribs 38 engage the flange 39, during which period a light reaction is transmitted to the brake pedal, as will become more apparent below. In the previously described form of the invention, the plate flange 50 seats against the rigid body 34 which permits the initial spring loading, if desired, of the plate 26. In FIGURE 3, the plate flange 50 may be spaced from the body 34 as shown. In the form of the invention in FIGURE 3, the plate 26 should be made for maximum yieldability, and accordingly, the radial slots 32 (not shown in FIGURE 3 but which are similar to those in FIGURE 2) extend to a point near the outer rim of the plate. In the modified form of the invention, also, the bead 47 is made lighter to offer less resistance for a reason which will become apparent.

Operation

In the form of the invention shown in FIGURE 1, with the valve elements in their normal positions, the variable pressure motor chamber 40 will be in communication with the constant vacuum chamber 41 in the manner previously described. Air flowing through the air filters 80 and 81 into the chamber 89 will be cut off at the valve 65. The motor, accordingly, will be vacuum suspended and the pressure responsive unit will be held in its off position against the combined seal and bumper 77 by the spring 37. The spring 68 maintains the seat 66 in engagement with the valve 65 and the latter valve is held in its normal position by the spring 86. The valve seat 70 will be in its normal open position.

When the brakes are to be applied, the pedal pad 17 is depressed to move the push rod 14 to the left, correspondingly moving the valve 65. As this valve moves to the left it will be followed by the seat 66 until the latter engages the valve 70, at which point the valve elements will be in lap condition. The vacuum chamber 94 will now be cut off from the passage 95 and motor chamber 40. Slightly further movement of the push rod 14, with movement of the valve seat 66 arrested by the valve 70, will crack the valve 65 to admit air from the chamber 89 through passage 95 into the chamber 40, thus subjecting the pressure responsive unit 25 to differential pressures to move it to the left to operate the master cylinder plunger 20 and initiate the operation of the brake cylinders. Since little force is required to move the brake shoes up to the drums, the initial motor operation takes place quite easily with little differential pressures on opposite sides of the pressure responsive unit 25.

As soon as the brake shoes engage the drums, movement of the master cylinder plunger 20 and pressure responsive unit 25 will be retarded, and a more rapid increase in pressure in the chamber 40 will occur. When this pressure reaches a predetermined point, the plate 26 will flex, the ribs 38 (or 38') acting as fulcrum means so that the radially outer portion of the plate 26 will move toward the left while the radially inner portion of the plate moves to the right. The differential pressures necessary for the flexing of the plate 26 per se are dependent upon the design characteristics of the plate 26 and associated elements. For example, the shorter the slots 32, the stiffer will be the plate 26. Moreover, with the plate 26 engaging the diaphragm bead 47 and with the plate flange portion 50 engaging the rigid body 34, the plate 26 may be pre-loaded to increase the differential pressures necessary for the flexing of the plate 25. This initial flexing will be resisted by the resilient diaphragm bead 47, and when this bead has been deformed to a certain extent by the flexing of the plate 25, the plate flange portion 50 will engage the cushion 62 and transmit reaction through the valve plunger 60 and push rod 14 to the pedal 15. For additional cushioning, the member 62 may be provided with small projections as shown. In this form of the invention, therefore, reaction will be transmitted to the pedal 15 after motor energization has taken place to a predetermined extent, and no initial reaction will be provided. The reaction will increase proportionally as motor energization takes place.

Obviously the present motor provides a follow-up action between the valve plunger 60 with its rod 14 and the pressure responsive unit 25. If, after the motor is energized to its maximum extent, additional braking is desired, pedal pressure will overcome the flexing of the plate 26 and direct forces will be applied through the valve plunger 60 to the rigid member 34 to assist the motor in applying greater force to the master cylinder plunger.

As previously stated, the resistance of the plate 26 to flexing may be controlled by the design and arrangement of the parts, such as the lengthening or shortening of the slots 32, the use or elimination of the ribs 33, the preloading of the plate 26 with the plate flange 50 engaging the member 34, the heaviness and consequently the resiliency of the bead 47, etc. In the modified form of the invention shown in FIGURE 3, substantially the same operation takes place except that an initial stage of reaction is provided by the resilient buttons 100. The fulcrum ribs 38 are normally spaced from the flange 39 and the buttons 100 are arranged radially outwardly thereof. The bead 47 is made relatively lighter to offer less resistance to the flexing to the right of the radially inner portion of the plate 26, and this plate preferably is not pre-loaded by the engagement of its flange 50 with the member 34. Therefore, in the initial stage of motor operation, relatively light differential motor pressures will cause the buttons 100 to act as fulcrums and the radially inner portion of the plate 26 will be flexed to the right more easily to provide an initial stage of reaction. This reaction will be relatively light, but appreciable to the feel of the operator's foot. As the second stage of motor operation takes place, the buttons 100 will be deformed and the ribs 38 will come into engagement with the flange 39 to act as fulcrum means, thus providing a second and heavier reaction as provided for in the form of the invention shown in FIGURE 1.

The releasing of the parts in each form of the invention will be apparent. When the pedal is released, the spring 86 will move the push rod 14 and valve plunger 60 back to their normal positions. As previously stated, the spring 86 is relatively strong to overcome differential pressures affecting the valve plunger 60, there being vacuum present at the left-hand end of the valve plunger and atmospheric pressure at the right-hand end thereof. This differential pressure is overcome by the spring 86 to return the valve parts to normal positions, under which conditions, vacuum will be re-established in the motor chamber 40 and the spring 37 will return the pressure responsive unit to its normal position. The plate 26 will be released from flexing forces and will resume its normal shape shown in FIGURES 1 and 3.

From the foregoing it will be apparent that the present construction makes use of the already-present essential structural parts of the booster motor to transmit reaction force in proportion to the motor power. Moreover, the transmission of the main or second reaction stage is delayed in the initial stage before the brake shoes are expanded to engage the drums. The principle of the reaction means is based on the inherent flexibility of the usual diaphragm plate used in booster motors of this type, and the plate 26 may be considered as a large Belleville washer. Such washer, with certain dishing, may be made to have a very low spring rate, and the present construction utilizes such characteristic to obtain the best results for the intended purpose of the apparatus. The construction also utilizes the rubber diaphragm 27 to cooperate with the plate to obtain the desired retardation of the reaction through the bead 47, and to produce a smooth transition to the normal reaction when the motor forces are increased.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. In a fluid pressure motor mechanism, a motor having an expansible chamber, a flexible diaphragm forming one wall of said chamber, a distortable diaphragm plate supporting said diaphragm, valve means adapted to direct fluid pressure from a source to said expansible chamber and from said chamber, means engaging said diaphragm plate to transmit force from said diaphragm plate, said diaphragm plate being adapted to distort in response to the fluid pressure in said expansible chamber, and manually operable means to control said valve means, said diaphragm plate directly engaging said manually operable means whereby distortion of said diaphragm plate opposes said manually operable means to thereby tend to reduce the power of said motor mechanism.

2. In a fluid pressure motor mechanism, a motor having an expansible chamber, a flexible diaphragm forming one wall of said chamber, a distortable diaphragm plate adapted to support said diaphragm, and control means including valve means for controlling communicating between said expansible chamber and a source of fluid pressure and further including a manually operable unit, said diaphragm plate being distortable in response to fluid pressure in said expansible chamber and having a portion directly engaging said manually operable unit when the latter operates said valve mechanism, whereby distortion of said diaphragm plate causes it to oppose movement of said manually operable unit and thereby tend to reduce the power of said motor mechanism.

3. A mechanism according to claim 2 wherein said diaphragm has a resilient portion engaging said diaphragm plate to tend to prevent distortion thereof and thereby delay the application of opposing forces to said manually operable unit.

4. A fluid pressure motor mechanism comprising a motor having an expansible chamber, an annular flexible diaphragm forming one wall of said chamber, an annular distortable diaphragm plate supporting said diaphragm, control means including a manually operable unit and control valve means partly carried by said manually operable unit for controlling communication between said expansible chamber and a source of fluid pressure, an axial body in which said manually operable unit is axially movable, and means co-acting between said body and said plate intermediate the radially outer and inner limits of the latter for fulcruming said plate whereby the outer portion of said plate is flexed in the direction of movement urged by pressure in said chamber while the radially inner portion of said plate tends to rock in the opposite direction, said radially inner portion of said plate being directly engageable with said manually operable unit to oppose valve-operating movement thereof to thereby tend to reduce the power of said motor mechanism.

5. A motor mechanism according to claim 4 wherein said plate is normally distorted out of planiform shape to tend to stiffen the plate and thus delay the transmission of opposing forces to said manually operable unit.

6. A motor mechanism according to claim 4 wherein said diaphragm is provided between said manually operable unit and the fulcrum of said plate with an enlarged resilient bead engaging said plate to resiliently oppose flexing movement thereof to delay the application of opposing forces to said manually operable unit.

7. A motor mechanism according to claim 4 wherein said diaphragm is provided between said manually operable unit and the fulcrum of said plate with an enlarged resilient bead engaging said plate to resiliently oppose flexing movement thereof to delay the application of opposing forces to said manually operable unit, said bead being annular and extending in the direction of bodily movement of said diaphragm and said plate when pressure is admitted to said chamber, said plate being shaped to project over said bead and radially inwardly so that the radially inner and outer portions of said plate lie in different planes to thereby stiffen said plate to further delay the application of opposing forces to said manually operable unit.

8. A motor mechanism according to claim 4 wherein said diaphragm is provided with an annular resilient bead projecting in the direction of bodily movement of said diaphragm and said plate when pressure is admitted to said chamber, said bead maintaining under pressure against said body the portion of said plate which engages said manually operable unit, thereby delaying the application of opposing forces to said manually operable unit.

9. A fluid pressure motor mechanism comprising a motor having an expansible chamber, a flexible diaphragm forming one wall of said chamber, a distortable diaphragm plate supporting said diaphragm, a rigid axial body forming with said diaphragm and with said plate a pressure responsive unit for said motor, said plate having rib means engageable with said body and forming fulcrum means for said plate whereby the admission of pressure to said chamber moves the radially outer portion of said plate and said diaphragm in one direction and rocks the inner portion of said plate in the opposite direction, said rib means being arranged closer to the radially inner limit of said diaphragm than to the radially outer limit whereby pressure acting against the radially outer portion of said diaphragm produces a moment about said fulcrum means greater than the moment acting in said opposite direction radially inwardly of said fulcrum means, and control means including a manually operable unit and valve means partly carried thereby for supplying pressure to said chamber upon operation of said manually operable unit, the radially inner portion of said plate being engageable with said manually operable unit upon the fulcruming of said plate to oppose valve operating movement of said manually operable unit.

10. A motor mechanism according to claim 9 wherein said diaphragm, radially inwardly of said fulcrum means, is provided with an annular resilient bead projecting therefrom in said one direction and engaging said plate to oppose movement of the radially inner portion of said plate in said opposite direction to delay the application of opposing forces to said manually operable unit.

11. A motor mechanism according to claim 9 wherein said diaphragm, radially inwardly of said fulcrum means, is provided with an annular resilient bead projecting therefrom in said one direction and engaging said plate to oppose movement of the radially inner portion of said plate in said opposite direction to delay the application of opposing forces to said manually operable unit, said bead maintaining the radially inner portion of said plate under pressure in contact with said body to delay movement thereof into engagement with said manually operable unit.

12. A motor mechanism according to claim 9 wherein said plate is annular and has its surface continuity disturbed to vary the normal stiffness thereof to determine its resistance to distortion and thus vary the pressure in said chamber necessary to engage the radially inner portion of said plate with said manually operable unit and oppose movement of the latter.

13. A fluid pressure motor mechanism comprising a casing, a pressure responsive unit therein comprising a rigid axial body, an annular diaphragm and a plate arranged between said diaphragm and said body, said diaphragm and said casing defining an expansible chamber, said plate having a rib engageable with said body and forming a fulcrum means for said plate whereby the admission of pressure to said chamber moves the radially outer portion of said plate and said diaphragm in one direction and rocks the inner portion of said plate in the opposite direction, a valve mechanism for said motor comprising an axially movable manually operable member movable from a normal position to connect said chamber to a source of pressure, said manually operable member having a cushion adjacent and normally disengaged from the radially inner portion of said plate whereby, when the radially inner portion of said plate is moved in said opposite direction in response to pressure in said chamber, it will engage said cushion to oppose valve operating movement of said manually operable member.

14. A motor mechanism according to claim 13 wherein said diaphragm is provided with an annular rib between said fulcrum means and said manually operable member and projecting in said one direction in engagement with said plate to oppose movement of the radially inner portion of said plate in said opposite direction to thereby delay the application of opposing forces to said manually operable member.

15. A motor mechanism according to claim 13 wherein said diaphragm is provided with an annular rib between said fulcrum means and said manually operable member and projecting in said one direction in engagement with said plate to oppose movement of the radially inner portion of said plate in said opposite direction to thereby delay the application of opposing forces to said manually operable member, said rib resiliently holding the radially inner portion of said plate against said body to further delay transmission of opposing forces from said plate to said manually operable member.

16. A motor mechanism in accordance with claim 13 wherein said plate is provided radially outwardly of said rib with resilient buttons normally engaging said body and maintaining said body out of engagement with said rib until pressure in said chamber deforms said buttons to move said rib into engagement with said body, during which period said buttons act as fulcrum means to flex the radially inner portion of said body in said opposite direction to lightly oppose valve operating movement of said manually operable member until said rib engages said body.

References Cited by the Examiner

UNITED STATES PATENTS

| | | | |
|---|---|---|---|
| 2,949,892 | 8/60 | Ayers | 91—369 |
| 2,980,068 | 4/61 | Stelzer | 91—369 |
| 2,990,917 | 7/61 | Stelzer | 91—369 |
| 3,002,499 | 10/61 | Schultz | 91—369 |
| 3,013,535 | 12/61 | Schultz | 91—369 |
| 3,026,852 | 3/62 | Stelzer | 91—369 |

FRED E. ENGELTHALER, *Primary Examiner.*

SAMUEL LEVINE, *Examiner.*